March 17, 1970 A. STRATIENKO 3,501,183

LINEAR SELF-INTERLOCKING WEDGE DEVICE

Filed June 29, 1965 5 Sheets-Sheet 1

INVENTOR.
Andrew Stratienko

BY

ATTORNEYS

LINEAR SELF-INTERLOCKING WEDGE DEVICE

Filed June 29, 1965 5 Sheets-Sheet 2

INVENTOR.
Andrew Stratienko

BY

ATTORNEYS

INVENTOR.
Andrew Stratienko

BY [signature]

ATTORNEYS

March 17, 1970 A. STRATIENKO 3,501,183

LINEAR SELF-INTERLOCKING WEDGE DEVICE

Filed June 29, 1965 5 Sheets-Sheet 4

INVENTOR.

Andrew Stratienko

BY

ATTORNEYS

LINEAR SELF-INTERLOCKING WEDGE DEVICE

Filed June 29, 1965 5 Sheets-Sheet 5

INVENTOR.
Andrew Stratienko
BY
[signature]
ATTORNEYS

United States Patent Office 3,501,183

Patented Mar. 17, 1970

3,501,183

LINEAR SELF-INTERLOCKING WEDGE DEVICE

Andrew Stratienko, 5139 N. 15th St., Philadelphia, Pa. 19126

Continuation-in-part of application Ser. No. 197,770, May 25, 1962. This application June 29, 1965, Ser. No. 468,089

Int. Cl. F16d *1/06*; B60b *27/06*

U.S. Cl. 287—52.06 4 Claims

ABSTRACT OF THE DISCLOSURE

The present invention deals with a self-interlocking wedge device that relates the coefficient of starting friction of the wedge on the straight surface of a member to the frictional angle of the inclined wedge surface and the angle of inclination of its inclined surface with respect to the direction of motion and also includes a mechanism for positively holding the wedge against the straight surface of a member which extends in the direction of motion during at least initial engagement for self-tightening.

The present application is a continuation-in-part of my copending application, Ser. No. 197,770, filed May 25, 1962, and now abandoned, for Linear Self Interlocking Wedge Device.

The present invention relates to self-interlocking wedge devices.

A purpose of the invention is to interpose a wedge between two relatively linearly movable curved members, one within the other, the wedge having one longitudinally straight surface and one longitudinally inclined wedge surface, both surfaces being curved in cross section, and to so adjust the coefficients of starting friction on the straight and inclined wedge surfaces and the angle of inclination of the inclined wedge surface that the normal force component produced by the inclined wedge surface will make the wedge self interlock with the related member at the straight wedge surface when the relative motion is directed toward the inclined wedge surface (tightening) in one direction of relative motion, and to pretighten the wedges.

A further purpose is to provide a linear self-interlocking wedge device which includes a first curved member, and a second curved member in spaced relation to the first member, movable along the first member in the direction of motion and having restraint against movement transverse to that direction of motion, the surface of the first member directed toward the second member extending longitudinally in the direction of motion and the surface of the second member directed toward the first member being a wedge surface longitudinally inclined to the direction of motion, one of the first and second members surrounding the other, and to place a curved wedge member between the first and second members, the wedge having a longitudinally straight surface in the direction of motion engaging said surface of the first member and having a longitudinally inclined wedge surface engaging said inclined wedge surface of the second member, having a lower frictional coefficient at the inclined wedge surface of the second member than the sliding frictional coefficient at the cooperating straight surface of the first member, the wedge device complying with the following condition $$f > \tan(\alpha + \phi)$$

where:

$f$ is the coefficient of starting friction of the wedge device on the straight surface of the first member, $\alpha$ is the angle of inclination of the inclined wedge surface with respect to the direction of motion, $\phi$ is the frictional angle of the inclined wedge surface, the coefficient of starting friction of the inclined wedge surface being $\tan \phi$.

In this way the normal component produced by the inclined wedge surface causes the straight surface of the wedge to interlock with the first member in one direction of motion.

A further purpose is to make the wedge if necessary self releasing in the opposite direction of motion by making the friction angle $\phi$ less than the angle of inclination.

A further purpose is to provide rolling elements such as balls or rollers between the inclined wedge surfaces.

A further purpose is to provide for repositioning and quick assembly of axial retainers of internal, external and annular form, which do not require machining of holes, internal or external threads, grooves or shoulders.

A further purpose is to provide in all types of self-interlocking retainers a disengaging feature which allows for preload of the retained part against the retainer device and release of the preload for disengaging the retainer.

A further purpose is to provide in all types of self-interlocking linear devices a preengaging feature which allows the preengagement of the retainer in any desired position along the supporting member with predetermined clearance or distance from the retained part, without applying any axial preload on such part. This provides means for releasing, preengaging and where desired forcibly disengaging the device if necessary.

A further purpose is to make the inner member a cylindrical shaft and the surrounding member an annular member in spaced relation to it, and to make the wedge member conical.

A further purpose is to provide a curved contour on the cooperating inclined wedge surfaces of the wedge and also of the second member which is other than circular in cross section so as to relatively rotationally interlock the wedge and the second member.

A further purpose is to key the wedge and the second member against relative rotation.

A further purpose is to utilize the invention for an interlocking retaining member such as a collar, flange, bushing, ring, or other internal, external or annular retaining means without requirement for machining shoulders threads, holes or grooves.

A further purpose is to utilize the wedge device of the invention as an overrunning linear bushing or clutch, or a stroke limiting mechanism, or lost motion mechanism, with an overrunning internal or external member as desired.

A further purpose is to quickly assemble or disassemble a self-interlocking retainer on a shaft or other machine element.

A further purpose is to provide an additional rolling element or elements, such as balls, or other rolling members, between the tapered surface of the wedge and an overrunning member in an overrunning linear bushing or clutch for starting self interlocking action when engaged.

A further purpose is to utilize the wedge device of the invention as a means for accurately controlling the interference fit between machine parts over a wide range, and producing if necessary an extremely high level of contact pressure using relatively low axial engaging forces.

A further purpose is to utilize the wedge device of the invention for the ease of assembly and disassembly of parts having interference fit.

A further purpose is to provide axial retainers or fasteners with controlled gripping power over a wide range and at a high level.

A further purpose is to provide an improved method of mounting and dismounting antifriction bearings with tapered bores, utilizing the principle of the present invention.

A further purpose is to provide a keyless hub mounting for securing a hub axially and torsionally on a shaft without shoulders and without fasteners, providing controlled gripping power in both directions of rotation over a wide range and at an extremely high level.

A further purpose is to provide a keyless hub mounting device without shoulders and without fasteners, for axially and torsionally securing a hub on a shaft in both directions of rotation and with gripping power limited only by the strength of the parts.

A further purpose is to utilize the wedge device of the invention as an interchangeable hub locking bushing for mounting sprockets, pulleys, couplings and other wheels having uniform bore diameters on shafts which are of different sizes.

A further purpose is to provide a device for reducing the load on the threaded portion of a conventional bolt and thus increasing the fatigue strength of the threads.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

The angles of inclination of the inclined wedges should actually be determined according to the formulas and examples, and the angles of inclination shown in the drawings are exaggerated in order to better illustrate that inclination exists.

Figure 1:
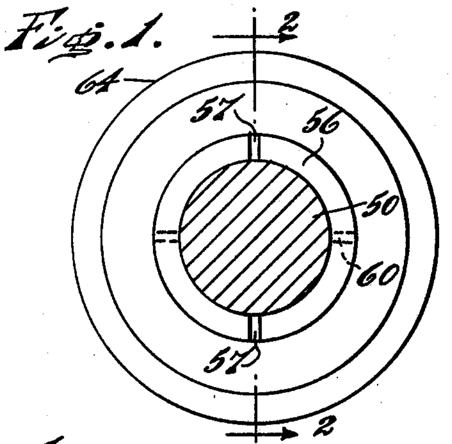
FIGURE 1 is an end elevation of a basic type of self-interlocking wedge device of the invention provided with a conical wedge, the device being of external form.

Describing in illustration but not in limitation and referring to the drawings:

There are numerous cases in the mechanical arts where thrust is desired on a shaft or rod. One common example is the anchoring or securing of components such as gears, cams, bearings, pulleys and the like to a shaft. Numerous expedients have been tried, including threading of the shaft, forming a shoulder, forming a groove and inserting a snap ring, drilling a hole and inserting a screw or pin, applying a collar provided with a set screw, or applying a special key which is capable of exerting thrust.

Thrust is also desired linearly in mechanisms such as overrunning bushings and clutches and lost motion devices.

The present invention is concerned with applying thrust to a linearly moving object, or thrust for or against linear motion to a rod, shaft, or the like (which will conveniently be referred to as a shaft) in a very simple, convenient and inexpensive manner which will produce self interlocking between a wedge and another member such as a shaft.

In accordance with the invention, a first force component is obtained from a wedging member which produces self interlocking between the wedging member and another element such as a shaft.

In order to accomplish this result, the wedging member acts at one side against a longitudinally straight transversely curved surface and at the other side against a longitudinal wedge surface which is transversely curved. The coefficient of starting friction of the wedging member against the inclined surface and the coefficient of starting friction of the wedging member against the straight surface are so interrelated to the angle of inclination of the inclined surface that the wedging member can grip at the longitudinally straight surface and can slide or roll and therefore apply a force component to the longitudinally inclined surface.

It should be emphasized that it is not sufficient merely to use a lower coefficient of friction at the longitudinally inclined surface as compared with a longitudinally straight surface, because the angle of inclination of the longitudinally inclined surface must also be interrelated to obtain the desired result.

Figure 2:
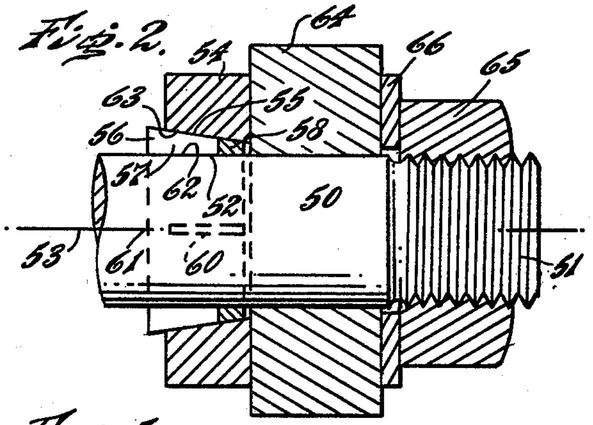
FIGURE 2 is a fragmentary diagrammatic axial section of the device of FIGURE 1, on the line 2—2.

In order to understand the invention more thoroughly, attention is invited to the basic form of FIGURES 1 and 2, which show a shaft 50 which in this case is cylindrical and which may, as shown, be threaded at 51 if desired, although this feature is immaterial from the standpoint of the broad aspects of the invention. It will be evident that any other suitable cross section, such as rectangle, square, hexagon, or any irregular shape may be employed for the shaft 50. There is no necessity to apply any machining to the shaft such as shoulders, grooves, holes or threads from the standpoint of the present invention. The shaft has an external surface which as viewed in FIGURE 2 is straight at 52 with respect to the longitudinal axis 53 of the shaft.

Surrounding the shaft in spaced relation is a thrust collar 54 which is symmetrical and coaxial with respect to the shaft and has at its inner surface an inclined wedge surface 55 as seen in FIGURE 2, said inclined wedge surface in this particular form being conical as shown in FIGURE 1. The inclined wedge surface 55 is close to the shaft 50 at one end of the thrust collar 54 and is farther away from the shaft at the other end.

The thrust collar is spaced from the shaft and the space between the thrust collar and the shaft in this form is occupied by a wedging member which in this instance takes the form of a flexible annular wedge 56. The wedge 56 is made flexible in this embodiment by providing notches 57 from the large end almost to the small end leaving a small connecting web of material 58 at the small end, the notches 57 being conveniently located at opposite diametrical positions and then at intermediate 90° positions providing reversed notches 60 from the small end almost to the large end leaving a connecting web of material 61 at the large end. Thus the wedging member is able to deform radially inwardly and outwardly as later described. In many of the later drawings these notches are omitted for simplicity in drawing, but it will be understood if notches are not used some other expedient such as extreme thinness of the wedging element will be employed so that it can elastically deflect as required in the invention.

The wedging element in the form of FIGURES 1 and 2 thus has a longitudinally straight surface 62 which adjoins the longitudinally straight surface of the shaft as viewed in FIGURE 2, the longitudinally straight surface being parallel to the axis 53, although, of course, as viewed in cross section in this particular form the surface 62 is curved and cylindrical.

The wedging element 56 also has an inclined wedge surface 63 which conforms with and cooperates with the wedge surface 55 on the thrust collar 54.

In the particular form of FIGURES 1 and 2 the longitudinally straight surface is on the inside of the wedging element and the inclined wedge surface is on the outside but as later explained this is not true of all forms.

It will be understood that the question of whether the wedging element 56 is of one piece as shown or consists of separate pieces or segments with suitable interrelation as by springs if desired is unimportant in the present invention as long as the wedging element is free to adjust toward and away from the cooperating members as later explained.

For the purpose of the discussion, the coefficient of sliding friction at the longitudinally straight surface 52 which in this case is on the shaft, will be designated $f$.

In the particular case of the form of FIGURES 1 and 2, this is the coefficient of sliding friction between the wedging element and the shaft at this straight surface.

The coefficient of sliding friction on the inclined surface 55 of the cooperating element, in this case the thrust collar 54, will be designated $\mu$. In the particular form of FIGURES 1 and 2 this is the coefficient of sliding friction between the inclined wedge surfaces 55 and 63. According to well known principles, however, $\mu$ is equal to the tangent of the frictional angle $\phi$ which is the angle on inclined surfaces 55 and 63.

When the relative motion of the parts is such that the wedging element 56 can move into the inclined wedge surface of the thrust collar in FIGURES 1 and 2, I have discovered that it is possible to make the wedging element grip the shaft if the shaft is moving to force the wedge on the inclined surface of the thrust collar 54, since a radially inwardly directed component of the wedge will further tighten the interlocking of the wedging element 56 to the shaft 50. Under these conditions the wedging element 56 may be said to self-interlock to the shaft. In order to accomplish this, three variables must be related in a certain way. They are the coefficient of starting friction on the straight surface 52, which I have designated $f$, the angle of inclination $\alpha$ of the inclined wedge surface 55 of the second member 54 to the direction of motion (axes), and the frictional angle $\phi$ of the inclined wedge surface 55, the coefficient of starting friction of which is $\tan \phi$.

It will of course be understood that in all of this it is assumed that there is firm starting engagement of the wedging element which will give positive holding power at the straight surface 52 to start the operation of self-interlocking.

The required relationship to achieve self-interlocking therefore is as follows:

$$f > \tan(\alpha+\phi) \quad (1)$$

It will be evident that the designer can achieve this result by choosing an appropriate angle of inclination $\alpha$ of the inclined surface along with a low coefficient of friction $\mu$. There may, however, in some installations as later explained be limitations which restrict the extent to which the angle of inclination can be changed. In order to obtain a low coefficient of starting friction on the inclined surface 55, the designer may adopt any one of a variety of well known antifriction expedients. He may, for example, apply rolling elements such as balls or rollers as later explained. He may provide a coating on the surface, a bearing shoe, or the like which will reduce the coefficient of starting friction on the inclined surface. Thus he may apply a coating of polytetrafluoroethylene (Teflon), molybdenum disulphide, tungsten disulphide, graphite, chrome plate, silver plate, silver plate impregnated by a soft metal such as indium, or the like. I may also adjust relative hardness of base and coating materials to reduce the coefficient of starting friction as by hardening the wedge surfaces 55 and 63 and interposing a soft coating on the other surface, for example, a coating of indium. I may also improve the perfection of machining at the wedge surface or surfaces as by grinding, lapping or honing. Due allowance of course will be made for the pressure in the particular installation and for the temperature.

It should be emphasized that the anti-friction means applied on the inclined wedge surface must be of a stable and permanent type which is firmly attached to one of the inclined surfaces and is capable of withstanding high pressure and preventing metal-to-metal contact under static conditions and resisting wear which would destroy the anti-friction conditions under frequent limited relative sliding. While it is, of course, evident that such high pressures will not be applied to the inclined wedge surface in every case, the anti-friction material should be capable of preventing metal-to-metal contact under static conditions at pressures of at least 3000 p.s.i. and preferably at least 5000 p.s.i. and most desirably at least 10,000 p.s.i.

In order to function in this way, a mere oil or grease film is not adequate, nor is a loose interposed piece of paper impregnated with oil or grease or a layer of elastic material of the character of rubber. It will, of course, be evident that the benefit from a dry lubricant coating such as molybdenum disulphide may if desired be enhanced by a lubricant such as oil or grease, but that oil or grease alone is not adequate to maintain the required conditions.

Where the device is not one in which the shaft must slide frequently with respect to the longitudinally straight surface 62 of the wedging element, advantage can also be obtained by increasing the coefficient of friction at the surface 52, as by rough machining, or by failure to provide materials with a low coefficient of friction at the longitudinally straight surface 52.

In the preferred embodiment of the device of the present invention no roughening on the longitudinally straight surface, as provided by grooves, threads or serrations, will be required, but instead the frictional coefficient of the inclined surface will be lowered. Special irregularities on the longitudinally straight wedge surface 62 are undesirable because they will scar, upset or otherwise impair the smoothness of cooperating surface 52.

Where, however, the device is of the character of an overrunning linear bushing or clutch so that frequent sliding must take place in one direction, the technique of increasing the coefficient of friction at the straight surface 52 is not available, and it will be sufficient to use ordinary steel-to-steel or even anti-friction material on the engaging surfaces at this point, and greatly reduce the coefficient of friction at the inclined surface 55 by means of rolling elements or hard permanently bonded lubricant or the like as earlier explained.

It will be evident that the ratio between the two quantities in formula 1 above is $$d=\frac{f}{\tan\,(\alpha+\phi)} \qquad (2)$$

This ratio is the factor of safety for self-interlocking. This factor should be appreciable to assure dependability of self-interlocking since the coefficients of friction may vary somewhat in the particular installation, depending upon temperature and the like.

It should be kept in mind that the absolute values of the coefficients of friction on the inclined wedge surface and the longitudinally straight surface are much less important than their relative values. For proper assurance of reliable functioning, it is very desirable to use a safety factor for self-interlocking of at least approximately 1.5, preferably 2.

When I refer herein to self interlocking it will be evident that the axial force applied to the wedging surface 55 in the direction toward the inclination of the wedge tends to move the member having the wedging surface in relation to either the wedging element or the element having the straight surface 52. Because the combined resistance due to inclination and friction on the inclined wedge surface 55 in the device of the invention is smaller than the frictional resistance on the longitudinally straight surface 52, relative movement will take place on the inclined wedge surface rather than on the straight wedge surface to engage the wedge and tend to deflect the element having the wedge surface 55. The element having the wedging surface 55 will progressively produce a force component normal to the longitudinally straight surface 52 causing the interlocking between the wedging element and the element having the straight surface 52 at this straight surface.

I have also discovered that the self interlocking wedge device of the invention can be made self releasing. In order for this to be true the frictional angle $\phi$ on the inclined surface 55 must be smaller than the angle of inclination $\alpha$ of such surface.

The factor of safety for self releasing is approximately the ratio between the angle of inclination and the frictional angle $\phi$ $$d=\alpha/\phi \qquad (3)$$

It will be understood when self releasing is referred to that the member having the wedging surface 55 is potentially preenergized by deformation during engagement of the wedging device, and applies an axial component of force to the inclined wedge surface 55 which tends to disengage the wedging element after the force holding the wedge element in energized condition is released. In order to make a self interlocking wedge retainer self disengaging, it is necessary that the disengaging force exceed the frictional resistance on the inclined wedge surface 55. This is only possible when the frictional angle $\phi$ is smaller than the angle of inclination $\alpha$. In order to accomplish this an antifriction medium must be present at the inclined wedge surface 55.

While it will be evident that the advantages of self-releasing should be used with self-interlocking where possible for best use of the invention, there are cases where full advantage of self-interlocking is not required, and antifriction means will be used at the inclined wedge surface 55 to facilitate engagement or disengagement of the interference fit. It may be necessary in such cases where the angle of inclination for ease of disengagement cannot be increased, or in cases where the angle of inclination, for ease of engagement, cannot be decreased as where other conditions control, such as the desire to use a tapered adaptor, to use a roller or a ball bearing.

The principles of self-interlocking and self-releasing can be applied to a wide variety of machine elements which function either under static or dynamic conditions.

In the various static devices according to the invention, where the relative motion on longitudinally straight wedge surfaces at operation is not required and the device is used as a retaining means, the wedge must be firmly initially pretightened by means of positive preengaging means before external load can produce the self-interlocking action. I find that self-interlocking by static devices is impossible without such positive initial pretightening, because the magnitude of the natural difference between the coefficient of sliding friction on the longitudinally straight surface 52 and the inclined surface 55 at low pressure is not sufficient for reliable starting of the self-interlocking action, on account of the instability of the coefficients of friction under different conditions such as the presence of vibration, oil films, and other factors which influence the coefficient of friction on the longitudinally straight surface. For this reason, the wedging member must be firmly held in position before the self-interlocking action produced by an external force, will start. In other words, positive initial pretightening is absolutely necessary for the operation of a self-interlocking static device.

In dynamic devices such as linear overrunning clutches according to the invention, where frequent sliding on the longitudinally straight wedge surface takes place, and initial positive pretightening of the wedge cannot be used, resort is had to other automatic means for holding the wedge member from initial slipping on the overrunning member, as later described.

The invention will be applied with a wedging element which has cross sectional surfaces which are of closed curved form, and in the preferred embodiment they will be circular in cross section, so that the wedging element is a cone and one of the first and second members is a shaft and the other an annular member. In some cases, however, the cross section of the wedging element at right angles to the axis can involve some other curve than a circular contour, which other curve forms a continuous closed curve as later described more in detail.

In the device of FIGURES 1 and 2, now to be described more fully, the machine part 64, which in this case is suitably a gear, pulley or the like, is suitably held at the left by the self-interlocking device of the invention as already described, which may be applied as a repositioning quick assembly axial retainer without any machining of grooves, holes, threads or shoulders.

This device must be tightly preloaded before part 64 is put in place and cannot be disengaged without releasing the load by moving the retained part.

The part is suitably fastened at the other side in any desired way, here shown as a nut 65 threaded on the thread 51 on the shaft, a washer 66 being interposed between the nut and the side of the machine part 64.

Members such as nuts referred to herein may if desired be provided with locking means, but this feature has been omitted as it is not critical in the present invention.

Figure 3:
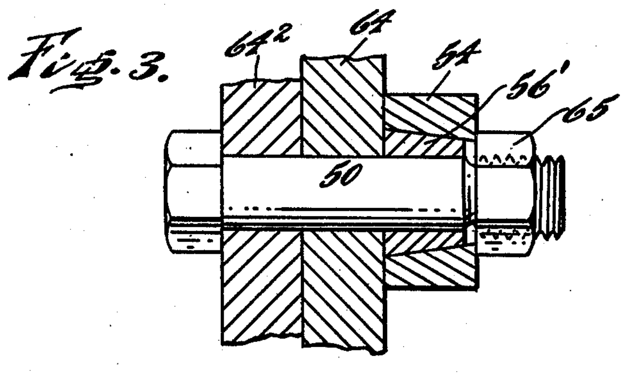
FIGURE 3 is a view similar to FIGURE 2 showing a modification.

FIGURE 3 shows a device similar to FIGURES 1 and 2, except that the self-interlocking combination of elements is interposed between the nut 65 and the retaining part on a conventional bolt or stud 50. Thus retained parts 64 and 64$^2$ are held together by the bolt 50 having a head on one side of the retained parts and a nut on the other side. The device of the invention consisting of a ring 54 and an annular wedge or sleeve 56' are located around a cylindrical portion of the bolt 50, the longitudinally straight internal surface of the wedge engaging the bolt and the inclined wedge surface on the outside engaging a cooperating inclined wedge surface on the inside of the ring 54. The self-interlocking device of the invention takes part of the retained load and reduces the load on the threads of the nut and the bolt, thus increasing the fatigue life of the threads. If a self-releasing device is used, it also will serve as a locking device for the nut, because residual stress or "spring load" is transmitted to the nut, preventing loosening of the nut due to vibration when the shank of the bolt is elongated in tension. In designing the device, for this arrangement the diameter of the cylindrical portion of the bolt and the dimensions of other parts are adjusted to provide the required holding power or to limit the required interference fit between the longitudinally straight contact surfaces of the wedge 56' and the bolt 50. The amount of interference fit is controlled by the allowance required for axial pretightening of the device. When the nut is fully pretightened all of this allowance should be used up and the outer wedge ring should be tightly jammed between the nut and the retained part.

One part of the total load transmitted through the bolt 50 in FIGURE 3 is exerted by interference fit between the bolt and the wedging member and the other part of the load is exerted by the thread and is transmitted through the outer ring 54 and the nut 65. The relation of load exerted by interference fit on the one hand and by the thread on the other depends upon the allowance left for axial pretightening of the device. This allowance can always be adjusted by placing shims between the wedge 56 and the retained part or between the outer ring 54 and retained part 64.

It is possible to adjust the dimensions and the angle of inclination of the inner and outer wedges of FIGURE 3 in such a way that the outer ring 54, after the nut 65 is fully pretightened, is not jammed between the nut and pretightening part, but leaves a certain clearance between the outer ring and the retained part. In this case the relation of load exerted by interference fit on the one hand and by the thread on the other, depends upon the relation between the angle of wedge inclination and the magnitude of frictional coefficient on the inclined wedge surfaces. If angle of inclination $\alpha$ or frictional angle $\phi$ exceeds the limit required by the self-interlocking principle $$(f > \tan(\alpha+\phi))$$

it is possible to develop by the tightening of nut 65 a certain clamping force between wedge member 56' and the retained part 64.

Figure 4:
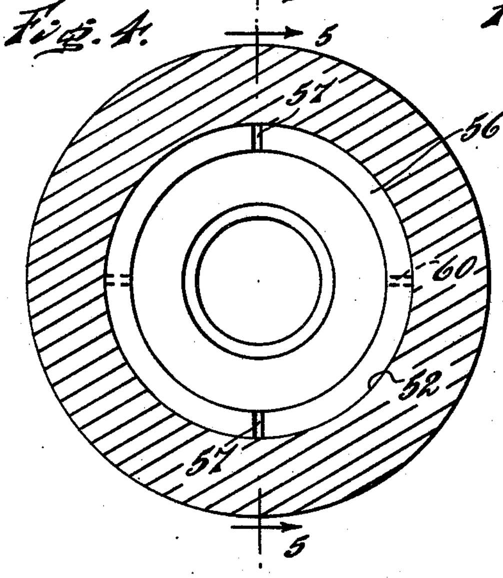
FIGURE 4 is an end elevation of a basic type of self interlocking wedge device with a conical wedge, the device being intended to operate internally.
Figure 5:
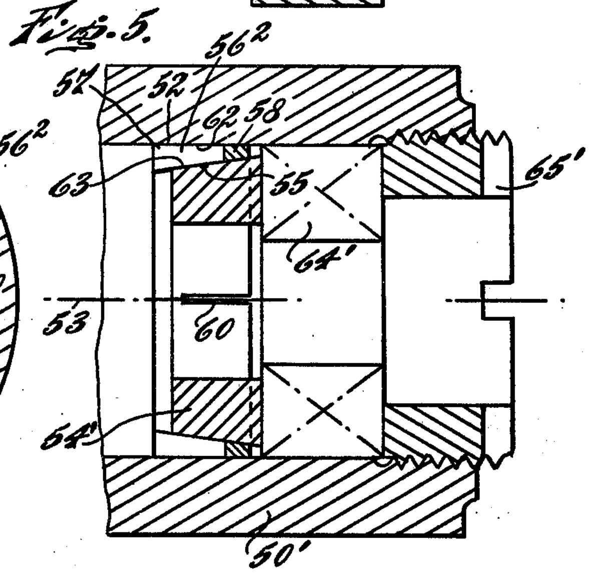
FIGURE 5 is a fragmentary axial section of FIGURE 4, on the line 5—5.

The device of FIGURES 4 and 5 constitutes in effect a reversal of the device of FIGURES 1 and 2. In this instance the longitudinally straight surface 52 is provided in a tubular bore of a machine element 50' and the wedge surface 55 is provided on the outside of an interior ringlike part 54'. The wedging element 56$^2$ has its longitudinally straight surface 62 at the outside and its inclined wedge surface 63 at the inside to cooperate with the wedge surface 55. As in the previously described form the wedging element 56$^2$ is resilient radially and holds the ringlike element 54' internally of the outer element 50'. A machine part, suitably a bearing 64', is thus anchored in one direction in the interior bore of the element 50', and may be secured in the opposite direction by a ring nut 65' which engages internal threads in outer element 50'.

Figures 6, 7, 8, 9, 10, 11, 12, 13:
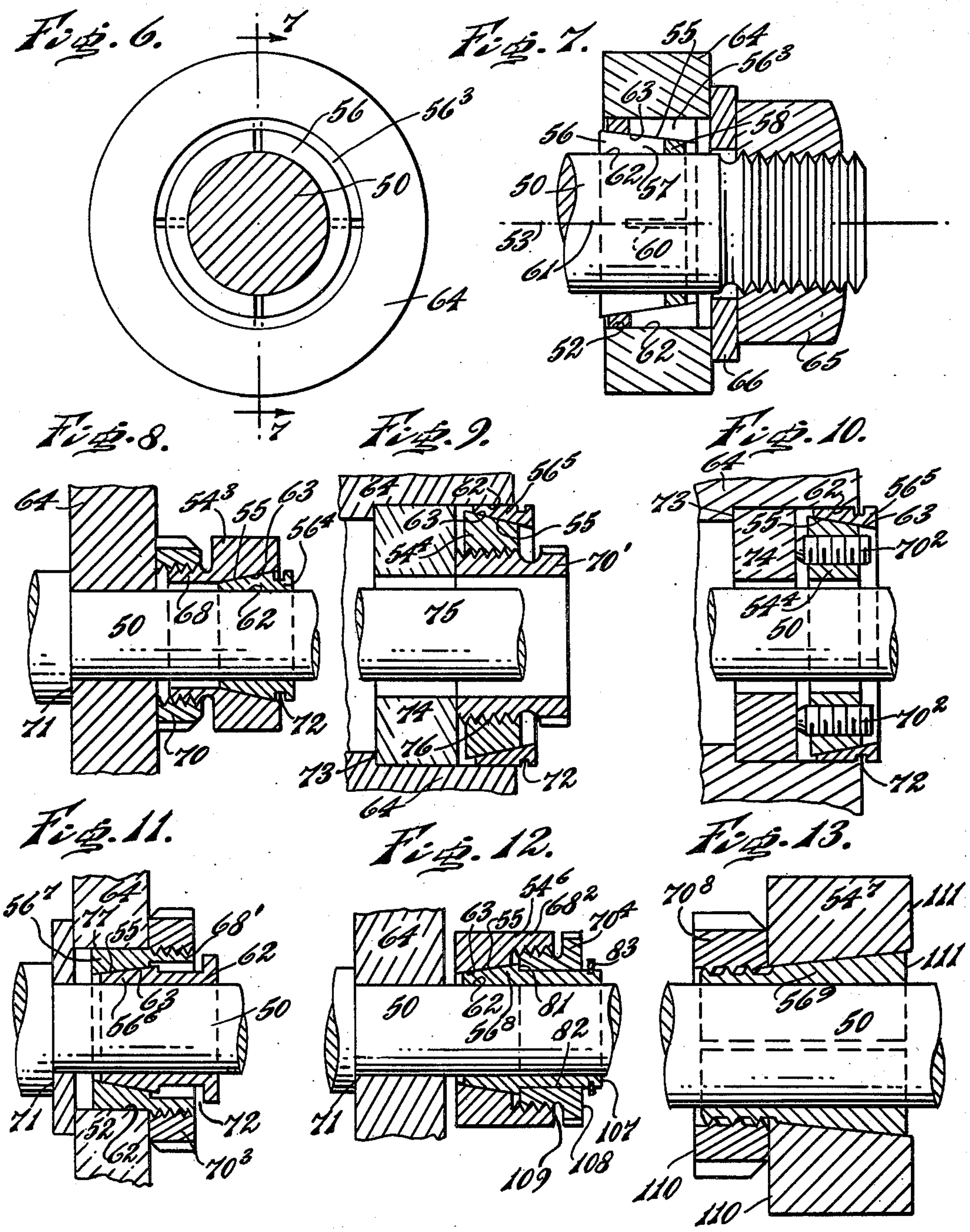
FIGURE 6 is an end elevation of the basic type of self interlocking wedge device of the invention with a conical wedge of annular form, the shaft being sectioned transversely.
FIGURE 7 is a fragmentary axial section of FIGURE 6, on the line 7—7.
FIGURE 8 is a fragmentary axial section of an external form of self-interlocking wedge device with disengagement feature.
FIGURE 9 is a fragmentary axial section of an internal form of self-interlocking wedge device with disengagement feature.
FIGURE 10 is a view similar to FIGURE 9 showing a modification.
FIGURE 11 is a fragmentary axial section of an annular form of self-interlocking wedge device with a disengagement feature.
FIGURE 12 is a fragmentary axial section of an external form of self-interlocking wedge device having the pre-engaging feature and the forced disengagement feature.
FIGURE 13 is a fragmentary axial section of a modified form of external self-interlocking wedge device of FIGURE 12, having the preengaging means placed externally at the opposite end of the wedge.

FIGURES 6 and 7 show an annular form, which resembles the form of FIGURES 1 and 2 except that the wedge surface 55, instead of being provided on the outer ring 54 is provided on a separate elastic ring 56$^3$ which may suitably be of the character shown in FIGURES 4 and 5, and which engages the inside of the machine part 64 at a straight annular surface 52. Thus the nut 65 and washer 66 serve to tighten the machine element laterally and the annular combination of two elastic wedges which occupy the space between the shaft 50 and the interior of the machine part 64 holds the machine part in place. Each of the wedging elements 56 and 56$^3$ in this annular form acts separately as if it were one of the wedging elements in the form of FIGURES 1 and 2 or in the form of FIGURES 4 and 5.

The feature of natural disengagement can be used in all of the forms of the invention where self interlocking retainers are involved, and where it is desired to disengage the device without moving a retained part. In such devices the one relative longitudinally movable member is tightly preloaded against the retained part by any suitable means such as a nut, cam, wedge, or other rigidly expandable member, which can be introduced between the retained part and the retaining device. For self disengagement the preload is released by moving the rigidly expandable member in the direction to release. The clamping device can be repositioned as desired along the axis of the shaft or other supporting member and then again tightened. The device does not require the machining of threads, shoulders, holes or grooves.

Considering now the device of FIGURE 8, external self interlocking is provided with natural disengagement.

The second member $54^3$ has a threaded extension 68 toward the part 64 which interthreads with nut 70 which can be moved axially to tighten against the part 64 which in this case engages at the other side shoulder 71 in the shaft. The wedge member $56^4$ in this case is of annular conical form and is provided with an annular recess 72 accessible beyond the second member $54^3$ for the purpose of prying the wedge member axially away from the second member if desired.

FIGURE 9 illustrates an embodiment similar to that of FIGURE 8, except that it is an internal form of self interlocking wedge device with natural disengagement. In this instance the machine part 64 has a shoulder 73 in its bore which suitably receives an element such as a bushing 74 and the device of the invention holds the bearing in place.

The shaft 75 is not involved in the holding operation but extends through the interior. In this instance the straight annular surface is on the inside of the machine part 64 and is engaged by external wedge $56^5$ whose interior wedge surface 63 is engaged by the exterior conical wedge surface 55 on the second member $54^4$. The second member $54^4$ has an interior thread 76 which threads with ring nut 70′ which brings axial pressure against the retained part 74.

FIGURE 10 is similar to FIGURE 9 except that instead of the ring nut 70′ threaded into the interior of the second member $54^4$, there are a series of circumferentially spaced set screws $70^2$ which extend in a direction parallel to the axis and engage the bearing member 74 and tighten the self-interlocking device of the invention against the inner bore of the machine element 64.

FIGURE 11 is similar to FIGURES 8, 9 and 10, except that it provides what may be described as an annular form of self-interlocking wedge device with natural disengagement. In this form the machine element 64 has a shoulder 77 and extends inwardly to engage the shaft at the shoulder 71.

There is an interior bore 78 in the machine element which is engaged by the self-interlocking device. The shaft 50 has a wedge element $56^6$ whose interior annular surface 62 as above described extends parallel to the axis and engages the circumferential exterior surface of the shaft. The inclined wedge surface 63 is surrounded by an elastic ring $56^7$ whose interior conical wedge surface 55 cooperates with the exterior inclined wedge surface 63. The elastic ring has a straight exterior surface 62 which engages the interior bore 52 on the machine part 64 and is interlocked to it. Axial locking can be provided by nut $70^3$ which is threaded on the extension 68′ from the second member and engages the opposite side of the machine element from that engaged by the shoulder 71 on the shaft.

In all of the forms of FIGURES 8 to 11, the natural disengagement can be accomplished by releasing the nut or set screw and if the device is self-releasing it will automatically release and it can be pried apart by means of the slot 72 or the like which can be used to move the wedge longitudinally.

The forms of FIGURES 12 to 22 may be used with any one of the basic types of self-interlocking retainers when operation is required without preloading against the retained part. This may be true when a predetermined clearance or distance between the retained part and the retainer is required. Devices of this character are said to be preengaged in that they are locked on the shaft or other support without applying axial force from the support.

Such devices can be repositioned along the axis and preengaged in any desired position by means of a nut, cam, wedge or other suitable means which will serve to pretighten the wedging element of the device of the invention against the second member. For disengagement it is necessary to release the pretightened member and if necessary force the wedge into disengaging position.

No machining to make thread grooves, shoulders or holes is necessary.

Before describing in detail self-interlocking wedge devices having a preengagement as an integral part of the device, it should be made clear that the device is built so that it can be used for mechanical control of the amount of interference fit at assembly of the machine elements, or with mechanical control of its gripping power, where the device is used as a retaining element. Utilizing self-interlocking wedge devices for this purpose is desirable especially where very heavy interference fits are needed, or where high accuracy and wide range of control of the amount of interference fit is necessary, or easy assembly or disassembly of the interference fit is required.

Wide use is already being made of interference fit in the assembly of machine elements. Typical examples are axial or torsional mountings of machine parts on a shaft or in the bore of a housing to prevent relative motion under axial or torsional load, for providing stability of coupled connections, for providing tightness of contact surfaces to prevent fretting corrosion, to prevent hammering action and the like. Such machine elements, such as antifriction bearings, couplings, retaining collars, bushings, gears, sprockets, sheaves, cams, and many others, require accurate control of the amount of interference in assembly as a necessary condition for proper operation. The amount of interference depends upon the operating conditions and is selected for each case in accordance with the particular requirements. In order that press fitted parts may properly function, close control of the amount of interference is absolutely necessary. It is, therefore, important in a wide variety of applications to control interference fit over a wide range, often at high levels, and with high accuracy.

The usual way for producing and controlling the amount of interference fit is by providing close machine tolerances on fitted parts. This is expensive, difficult in assembly and disassembly and makes precise control practically impossible. Another way to accomplish interference fit is by accurately matching male and female conventional tapers, engaged by nuts, screws, or other fastening means which are capable of producing a very high axial force to achieve the needed interference fit in the contact area between the tapered surfaces. Another procedure in the prior art is to use split tapered sleeves or bushings, interposed in the annular spaces between a shaft and a hub and urged into place by screws or nuts. The greatest difficulties in these prior art methods are the problem of engagement or disengagement, the difficulty in maintaining accurate control of the interference fit, the difficulty in achieving high enough interference fit in assembly and the very high axial force needed for engagement. All of these disadvantages result from very high frictional resistance on the inclined surfaces, the possibility of galling at high pressures and the resistance due to the inclination. Increase in the angle of inclination leads to trouble in assembly and decrease in the angle of inclination leads to trouble in disassembly.

All forms of self-interlocking wedge devices which have preengaging means built into the device as later described, are suitable for use when mechanical control in the amount of interference fit is required. Drastic reduction of friction on the inclined wedge surfaces, elimination of the possibility of galling, avoiding metal contact, and reduction of the taper angle while still maintaining the self-releasing feature make it possible to preengage using relatively low axial preengaging forces produced by the preengaging mechanism. When the self interlocking wedge device with the preengaging mechanism is used as a retaining collar for taking axial load, or when it is used as a hub locking device for taking torsional moment, gripping power of the device can be accurately controlled at any practically needed level by initial pretightening and the interlock wedge device may then be loaded as desired and as later described. When the self interlocking wedge device of the present invention is used with preengaging means for ease of mounting or dismounting of tightly fitting parts, the amount of interference fit may also be accurately controlled by the initial pretightening of the preengaging means at any practically needed level as later described.

When the device is used as a linear self-interlocking clutch, the preengaging feature may be accomplished by means of a spring which as later explained will frequently be a helical spring, but may be a flat or other suitable spring, as well known in the art. The spring then accomplishes presetting to establish slight initial friction between the overrunning member and the supporting part (whether internal or external), and provide the control of radial clearance between the inclined surface of the wedge which is important for relative stability of the first and second member at the disengaged or overrunning position.

FIGURE 12 illustrates an external form of self-interlocking wedge device with the preengaging feature and the feature of forced disengagement. In this instance, the wedging element 56$^8$ has an internal straight cylindrical surface which surrounds and engages the outside of the shaft 50 and has an external conical wedging surfare 63 which engages the internal conical surface 55 of the second member 54$^6$.

The second member has an extension 68$^2$ in this case which is internally threaded and receives ring not 70$^4$ which engages at one end against shoulder 81 on the wedging element 56$^8$ and surrounds an annular straight extension 82 of the wedging element and is limited in motion at the other end by snap ring 83 which engages in a suitable groove in the outside of the wedging element. The nut when moved in one direction tightens the wedging element with respect to the first and second member and when moved in the other direction positively forces the device to loosen or disengage. When the wedge device takes external load applied in the direction to the surfaces 107, 108 or 109 the gripping power of the device may be preset by adjusting the interference fit controlled by appropriate initial tightening of ring nut 70$^4$.

FIGURE 13 is similar to FIGURE 12 except that the preengaging nut 70$^8$ acts externally cooperating with threads on the wedge 56$^9$ against the ring 54$^7$ from the opposite end as compared with FIGURE 12, sufficient initial pretightening of nut 70$^8$ assuring starting of self-interlocking action produced by retained axial force, applied against the surfaces 110, and desired axial securing if the retained force should be applied in opposite direction against surfaces 111.

Figures 14, 15, 16, 17, 18, 19:
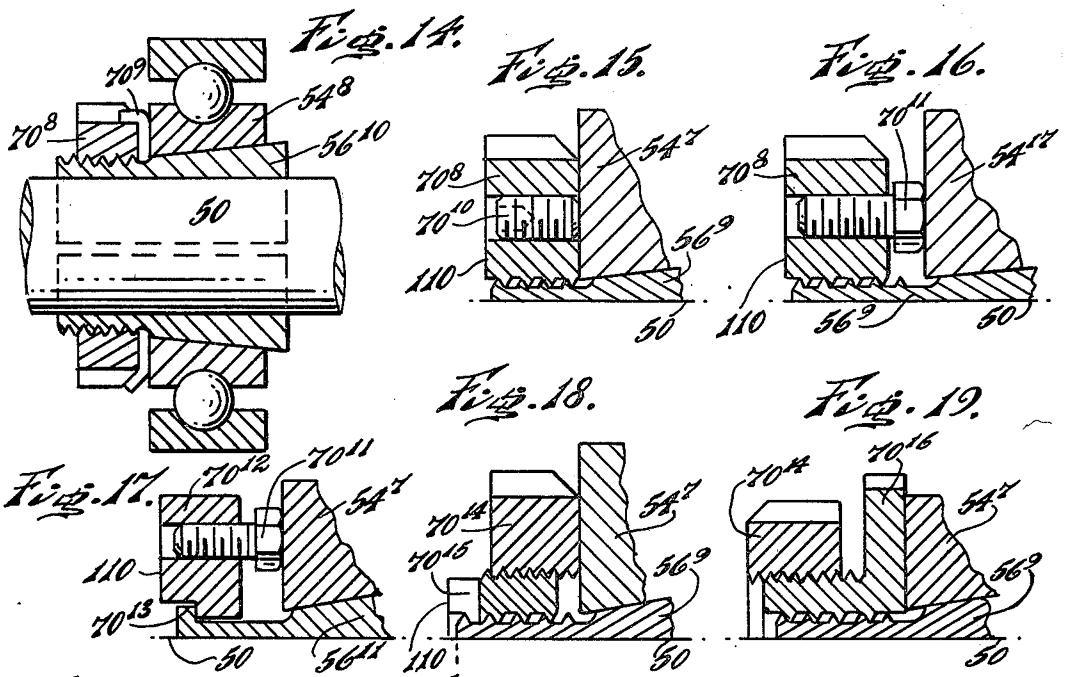
FIGURE 14 is a fragmentary axial section of another modification of an external self-interlocking wedge device of FIGURE 12, having the preengaging means placed externally on the extension of the thinner end of the wedge and having the retained part made integrally with the second member.
FIGURE 15 is an enlarged fragmentary axial section of FIGURE 13 showing a detail of the preengaging means.
FIGURE 16 is a view similar to FIGURE 15 showing a modified preengaging means.
FIGURE 17 is a view similar to FIGURE 15 showing a further modification of the preengaging means.
FIGURE 18 is a view similar to FIGURE 15 showing a still further modification of the preengaging means.
FIGURE 19 is a view similar to FIGURE 15 showing a further modification of the preengaging means, and illustrating particularly a nut for producing clamping forces against the retained part.

FIGURE 14 is similar to FIGURE 13, except that unlike FIGURE 13 which uses a special thread allowing axial freedom between the nut and the threaded wedge device, FIGURE 14 uses a standard thread on the wedge device 56$^{10}$ and builds the ring 54$^8$ as part of the retained part which is in this instance a bearing which is being held on the shaft. This device accurately controls the amount of interference fit for mounting an anti-friction bearing, and facilitates dismounting. In order to control the interference fit precision control of the angle of turning of nut 70$^8$ can be employed after the nut firmly seats against the bearing, or a torque wrench can be applied, and a washer 70$^9$ has tabs which are bent into interlocking engagement to prevent unintended loosening of the nut.

In the preferred embodiment of FIGURE 13, the thread and the nut 70$^8$ are constructed as shown in FIGURE 15 with a special thread which allows axial play on the wedge device and a cooperating thread on the nut 70$^8$. In a preferred form of the device, the pretightening nut 70$^8$ is pretightened to a level exceeding the expected load to be retained. When the retained load applied against the nut exceeds the level of initial pretightening, axial looseness in a special thread will allow limited relative motion on the inclined wedge surface, producing self-interlocking between the longitudinally straight smooth surfaces of the wedge device 56$^9$ and the shaft 50. Of course, it will be evident that the devices can be repositioned on another part of the shaft as desired. For accurate positioning, allowance should be made for pretightening, and after this allowance has been used by initial pretightening, closer positioning can be obtained by slight additional tightening or loosening of the nut 70$^8$. Circumferentially placed set screws 70$^{10}$ are provided on larger sizes of the devices to facilitate initial pretightening.

It will be evident that the device of FIGURES 13 and 15 is capable of retaining force applied to the outer ring 54$^7$, opposite to the pretightening nut 70$^8$. In this case force will be exerted by interference fit, presetting at initial pretightening at any required level. If the device with the parts loosened is placed tightly against the retained part without any clearance between the outer ring and the retained part, it is possible by pretightening to compress the outer ring 54$^7$ to produce a clamping force against the retained part.

FIGURE 16 is a variation of FIGURE 15 which utilizes for initial pretightening cap screws 70$^{11}$. Nut 70$^{10}$ may be positioned with any desired clearance between the retained part and the nut, leaving the cap screws accessible for pretightening by a wrench. It will be understood that the initial pretightening of the device will not affect the previously adjusted clearance.

FIGURE 17 is similar to FIGURE 16 except that the circumferentially spaced cap screws 70$^{11}$ operate on a ring 70$^{12}$ which is retained by a shoulder 70$^{13}$ on the end of the wedge 56$^{11}$. The cap screws thus perform the function of the nut. The ring 70$^{12}$ can rotate with respect to wedge device 56$^{11}$.

FIGURE 18 provides two separate nuts; an inner nut 70$^{15}$ which is operating on a thread similar to that shown in FIGURE 15 providing longitudinal play and an outer nut 70$^{14}$ threaded on the inner nut and bearing against the end of the ring 54$^7$.

In the forms of FIGURES 13, 15, 16, 17 and 18, when the parts are positioned in loose condition but tightly engaging the retained part by surface 110, they may develop clamping force against the retained part by initial pretightening. The threaded inserts which engage the special thread and which receive the ringlike pretightening nut are slotted for adjusting and holding the insert in position with a spanner wrench so that it will not turn when the nut is pretightened.

FIGURE 19 is similar to FIGURE 18 and shows a ring-like pretightening nut 70$^{16}$ with a threaded engagement with the wedge member 56$^9$ and providing play in the threads. Threaded on the nut 76$^{16}$ is a nut 76$^{14}$ which can be used to produce a longitudinal clamping force against a member to the left in FIGURE 19 while the nut 70$^{16}$ is applying clamping force against the retained part 54$^7$.

Figures 20, 21, 22, 23, 24:
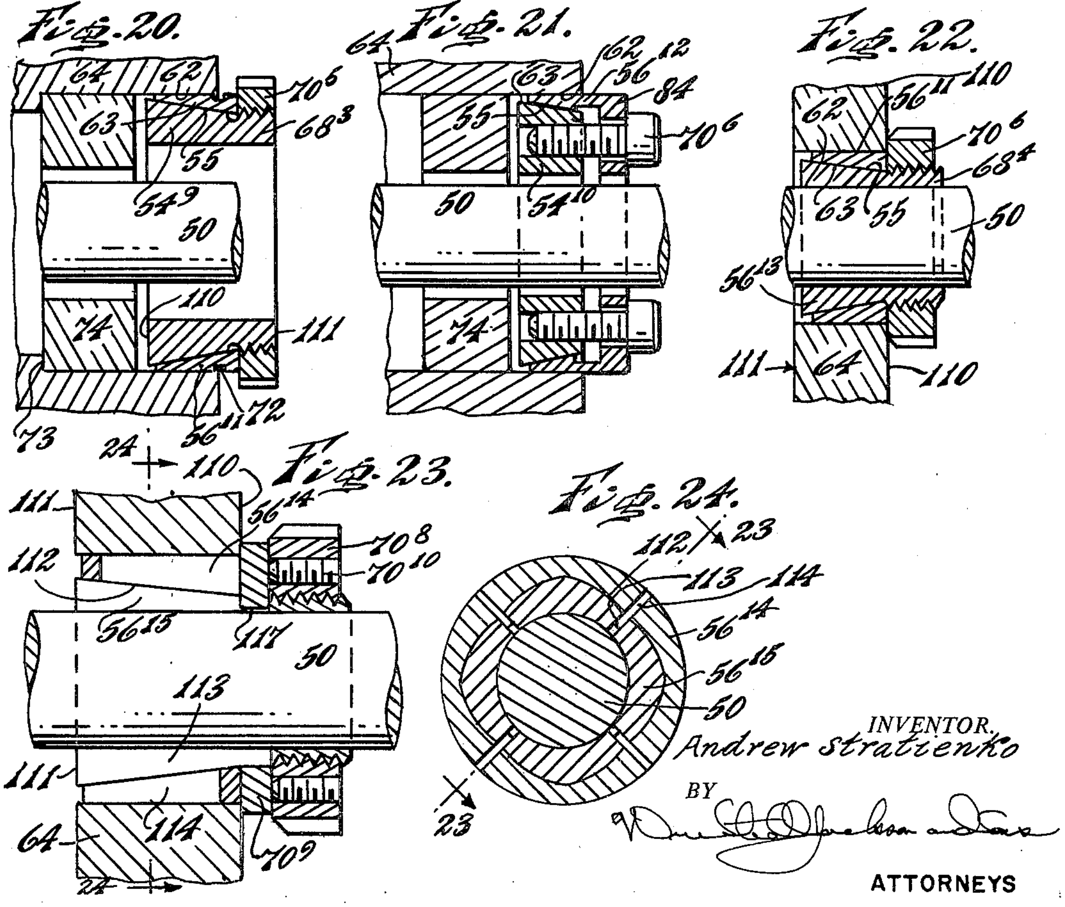
FIGURE 20 is a fragmentary axial section of an internal form of self-interlocking wedge device with the preengaging feature and provision for forced disengagement.
FIGURE 21 is a view similar to FIGURE 20 showing a variation.
FIGURE 22 is a fragmentary axial section of an annular form of self-interlocking wedge device showing the preengaging feature and the provision for forced disengagement.
FIGURE 23 is a fragmentary axial section of a modified self-interlocking wedge device, having preengaging means similar to FIGURE 22, with a multiple wedge arrangement in which the wedge members have radially inclined wedge surfaces of curved shape with alternately positioned direction of radial wedge inclination around the circumference.
FIGURE 24 is a section of FIGURE 23 on the line 24—24.

FIGURE 20 illustrates a somewhat similar device which has a self-interlocking wedge with preengaging feature, but the device operates internally in the bore of the machine part 64 so that the extension 68$^3$ on the second member 54$^9$ carries threads which engage nut 70$^5$ to force the wedging element 56$^{11}$ into engagement externally.

FIGURE 21 is a device similar to that just described except that the external engagement on the nut of the bore of the machine element is in this case made by a series of circumferentially displaced set screws 70$^6$ which are threaded through a flange 84 from the wedging element 56 into the second element 54$^{10}$.

FIGURE 22 is an annular form similar to FIGURES 12, 20 and 21, except that the wedge surface 55, instead of being provided on the outer ring 54$^6$, is provided on a separate elastic ring 56$^{11}$, which may suitably be of the character shown in FIGURE 20, and which engages the inside of the machine part 64 at the straight annular surface. Each of the wedging elements $56^{11}$ and $56^{13}$ in this annular form acts separately as if it were one of the wedging elements in the form of FIGURE 12 or in the form of FIGURE 20. Extension $68^4$ on the wedging member $56^{13}$ is externally threaded, similarly to the second member $54^9$ in FIGURE 20, to receive a nut $70^6$ which tightens and locks the wedging members in place. Firm initial pretightening of nut $70^6$ assures safe starting of interlocking action, produced by retained force applied to the machine part 64 against surface 110 and safe axial securing of the part by interference fit, if the retained force should be applied in the opposite direction against the surface 111. In case this device is used for mounting antifriction bearings or other parts requiring an interference fit, the amount of interference may be controlled by the angle of turning of nut $70^6$. It will be evident that the device of FIGURE 22 may also be used for facilitating assembly and disassembly of parts with interference fit.

FIGURES 23 and 24 represent a modified form of the annular wedge device with the preengaging mechanism of FIGURE 22, showing wedging members $56^{15}$ and $56^{14}$ having a multiple wedge arrangement with radially inclined curved wedge surfaces and an alternately positioned direction of radial wedge inclination around the circumference. Each of wedging members $56^{15}$ and $56^{14}$ has wedging surfaces which are of reduced frictional coefficient on a longitudinal inclined wedge surface 112, but when viewed in cross section as in FIGURE 24 this surface 112 is divided segmentally around the circumference into convex fluted curves instead of being circular. The inner wedge is slotted at 113 running toward but preferably not into the threaded end portion, and the outer wedge is slotted at 114 running alternately toward but preferably not fully to the end, so that relative expansion and contraction radially is possible. For preengagement a nut $78^8$ is provided which may have circumferentially spaced set screws $70^{10}$ as in FIGURE 15 and pressure is applied to the outer wedge by the nut through an annular washer $70^9$.

In FIGURES 23 and 24 it will be evident that there is a multiple wedge arrangement with radially inclined curved wedge surfaces which alternately change their direction as one follows the circumference in FIGURE 24. The angle of radial inclination of these surfaces, shown on FIGURE 24, is exaggerated for clarity of illustration. These wedge surfaces need not be of cylindrical form but may be of other suitable curvature which is immaterial from the broad aspect of the invention, providing the type of curve used has so adjusted angles of radial inclination on curved surfaces, that it will produce mechanical self-interlocking on smooth concentric and longitudinally straight contact surfaces of wedge members $56^{14}$ and $56^{15}$ caused by torsional load transmitted through the self-interlocking device, similarly to the self-interlocking produced by axial force described in connection with FIGURES 1 and 2.

It will be noted that in FIGURE 23, the thrust washer $70^9$ is in contact with the retained part 64 or with the outer wedge member $56^{14}$ and is preferably restrained against rotation by engagement of a suitable tongue 117 extending into a slot in the inner wedge member, providing in this way radial bearing area for outer wedge ring $56^{14}$ when limited relative sliding will occur at self-tightening of the device. This contact surface of washer 23 preferably should have antifriction coating for the reduction of friction, when the relative motion at these contact surfaces will take place.

Figure 25:
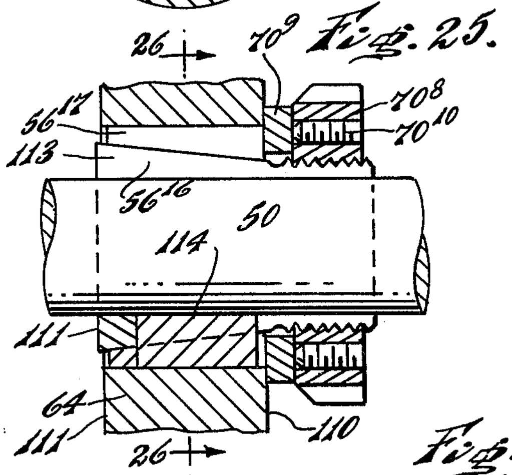
FIGURE 25 is a fragmentary axial section showing a modified form of annular self-interlocking wedge device having preengaging means similar to that shown in FIGURE 22, but illustrating key means for preventing relative rotation of the inclined wedge surfaces and having a multiple preengaging jackscrew.
Figure 26:
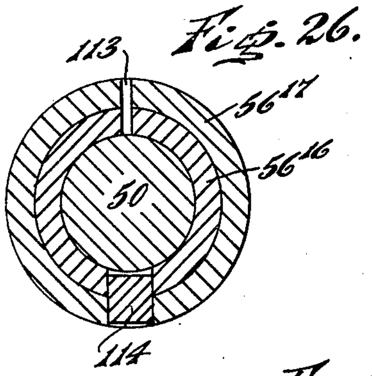
FIGURE 26 is a fragmentary section of FIGURE 25 on the line 26—26, omitting the surrounding hub.

FIGURES 25 and 26 illustrate a modified form of annular device similar to FIGURE 22, except the key member 114 provided in cooperating slots on the inner and outer wedges $56^{16}$ and $56^{17}$ prevents relative rotation on inclined surfaces of wedge members $56^{16}$ and $56^{17}$ when torsional load is transmitted through the device. The cooperating annular wedge members $56^{16}$ and $56^{17}$ have a longitudinal slot 113 permitting circumferential expansion and contraction and have a key 114 at an opposite point contained in a suitable key slot running the full distance radially from the inner member 50 to the outer member 64. The key slot and key, of course, do not restrict longitudinal relative motion on inclined surfaces for initial preengagement when tightening nut $70^8$ or multiple jack-screw $70^{10}$. The key slot in this case, however, does not extend for the full length of the wedge member, leaving material of the wedge members at the side opposite from the preengaging nut $70^8$ to maintain the integrity of the wedge device and prevent the possibility of jamming the key in the slot when the wedge members are contracting circumferentially.

Figure 27:
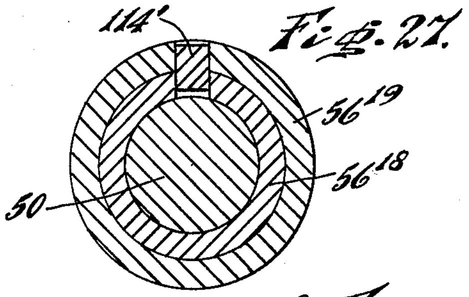
FIGURE 27 is a view similar to FIGURE 26 illustrating a modified key.

In FIGURE 27 is shown a modified form of key slot similar to FIGURE 26. In FIGURE 27 the key 114' is occupying a slot extending radially and longitudinally throughout the inner wedges $56^{18}$ and outer wedges $56^{19}$. This slot can also be made wide enough and with enough tolerance to the key to allow for contracting and expanding the inner and outer wedges, doing away with the necessity for separate slots 113.

Figure 28:
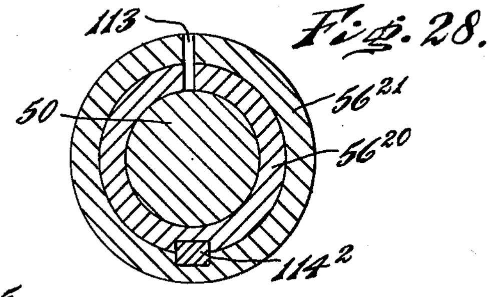
FIGURE 28 is a section similar to FIGURE 26 showing a further modification in the key.

In the form of FIGURE 28 a key $114^2$ is provided in cooperating slots on the inner and outer wedges $56^{20}$ and $56^{21}$, the key being provided in slots that do not extend deeply enough into either wedge to cut it fully through. The slot 113, cutting clear through both wedges, allows for flexibility for tightening and loosening.

It will be evident that in FIGURES 23 to 28 inclusive self-interlocking is produced with unlimited gripping ability when the force is applied to the retained part 64 against a surface 110 and also will retain force applied against a surface 111 with gripping power controlled by the initial pretightening. The devices of FIGURES 25, 26, 27 and 28 are also capable of securing a machine part 64 torsionally for transmitting torque in both directions of rotation with gripping power controlled by the pretightening of the nut $70^8$ or the screw $70^{10}$. The device of FIGURES 23 and 24 is capable of securing machine part 64 torsionally for transmitting torque in both directions of rotation with gripping power produced by torsional load limited by the strength of the parts transmitting torque rather than gripping ability of the device.

Figures 29, 30, 31, 32, 33:
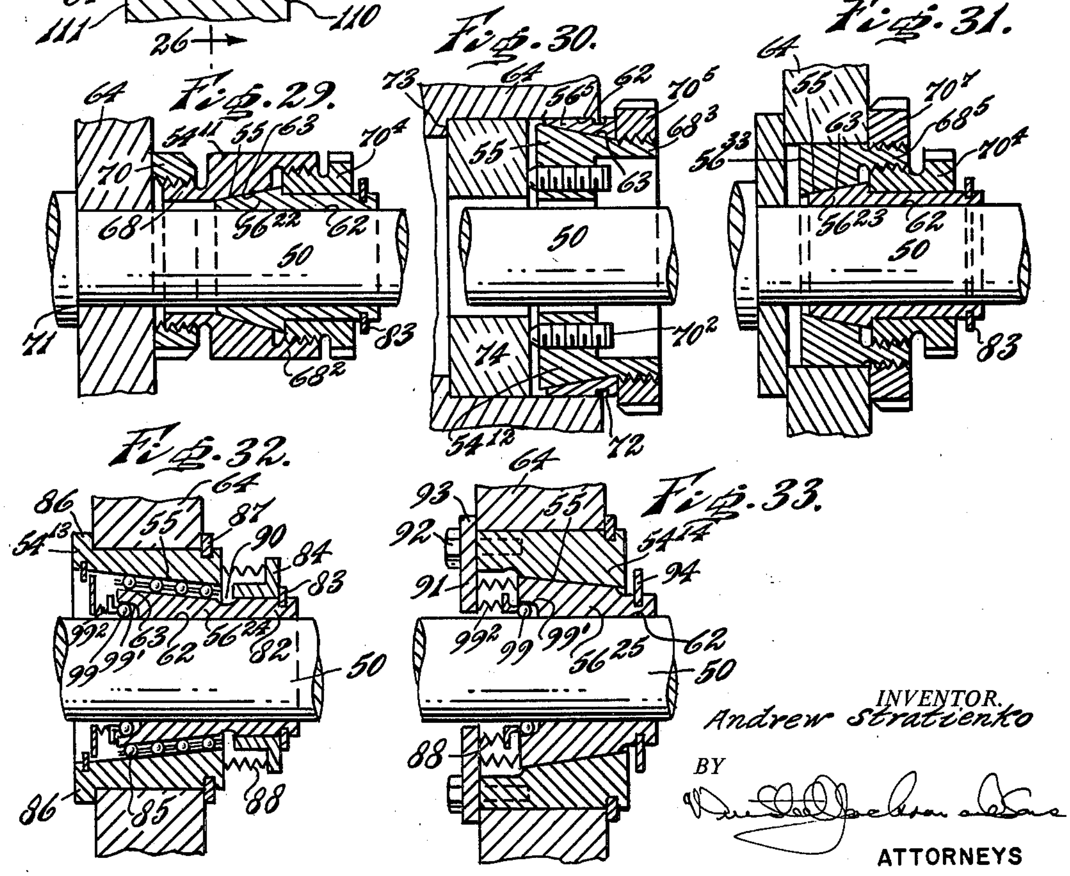
FIGURE 29 is a fragmentary axial section of an external form of self-interlocking wedge device showing a combination of the preengaging feature and the disengaging feature.
FIGURE 30 is a fragmentary axial section of an internal form of self-interlocking wedge device showing combination of the preengaging feature and the disengaging feature.
FIGURE 31 is a fragmentary axial section of an annular form of self-interlocking wedge device with the combined features of preengagement and disengagement.
FIGURE 32 is a fragmentary axial section of an external form of linear self interlocking overrunning clutch with rolling elements interposed between inclined surfaces of the wedge (that is, the overrunning inner member).
FIGURE 33 is a fragmentary axial section of a modified form of the self-interlocking overrunning clutch of FIGURE 32.

FIGURE 29 is an external form which combines certain features of FIGURES 8 and 12. In this case the wedging element $56^{22}$ may be arranged as in FIGURE 12 and the second element $54^{11}$ has both the extension 68 of FIGURE 8 threaded to the nut 70 for natural disengagement and also the extension $68^2$ threaded to the ring nut $70^4$ for preengagement and forced disengagement.

The form of FIGURE 30 has certain features of FIGURES 10 and 20, since it has the set screws $70^2$ for engaging the side of the machine part 74 and also it has the nut $70^5$ on the second member $54^{12}$.

The form of FIGURE 31 embodies features of the annular form of FIGURES 11, 12 and 22, in that the wedging element $56^{23}$ is similar to that shown in FIGURE 12, but the wedge element $56^{33}$ is engaged within the bore of the machine element 64 and its extension $68^5$ is externally threaded to receive nut $70^7$ and internally threaded to interthread with the ring nut $70^4$ as already described.

The form of FIGURES 32 to 37 shows various linear self-interlocking overrunning clutches.

FIGURE 32 illustrates rolling elements, in this case balls 85, interposed between the inclined wedge surface 63 of the wedging element $56^{24}$ and the inclined wedging surface 55 of the second member $54^{13}$. It will be evident that the rolling elements 85 may take various forms, as well known in the art, and that they will suitably be provided with a cage which may be a typical antifriction bearing cage, as well known in the art, said cage not being shown in detail herein.

It will be evident that slots are employed since the wedging member is suitably fixed to the second member in such a way that relative rotary motion between the members is prevented, but the members may freely move in respect to one another axially. This for example, can be accomplished by a pin in the second member inserted in an axial slot of the wedging member where necessary. The axial slots serve to increase the flexibility of the wedge.

It will also be evident that no details of lubrication means are shown and no details of oil slots are included but that such will of course be employed where required, as well known in the art.

The form of FIGURE 32 is an external linear self interlocking overrunning clutch, the machine element 64 being held between a flange 86 at one end of the second element 54$^{13}$ and a snap ring 87 at the other end fitting in a suitable groove in the outside of the second element.

In this case the extension 82 on the wedging element and the snap ring 83 hold a spring retainer flange 84 which at intervals around its circumference mounts helical compression springs 88 which act against the second member 54$^{13}$ to urge it into engagement. There is sufficient freedom at 90 between the flange 84 and the second element 54$^{13}$ so that the second member 54$^{13}$ can move axially for overrunning purposes.

In all of FIGURES 32 to 37, inclusive, means are provided for positively holding the wedge member from initial sliding or slipping on the first member, when engaging for self-interlocking. These include a ring of balls 99 acting between the linear surface of the shaft or the ring and an inclined wedge surface 99' provided for wedging of balls 99. The balls are thus directly interposed between the overrunning member and inclined surfaces on the wedging member, and are urged toward engagement by springs 99$^{2}$ acting from suitable spring abutments on the opposite wedging member preferably through suitable pressure distributing rings as shown. These positive means for holding against initial slipping on the first member, which are essential for use with an overrunning clutch of the present invention to start self-interlocking action, function by reason of the relatively big difference between rolling and sliding frictional coefficients at the points of contact of the balls 99 on the straight and inclined wedge surfaces. Since these balls are in point contact instead of surface-to-surface contact, they are very effective in breaking any oil film present on the overrunning member and making a reliable engagement and holding the wedge member on the overrunning member before self-interlocking action starts, and in order to enable it to start. It will be evident that the main portion of the load transmitted through the device in operation is taken by the cooperating inclined surfaces of the second member and the wedge member and the function of the balls 99 with the spring urging them toward engagement is limited only to making certain that self-interlocking action starts reliably.

The device of FIGURE 33 is similar to that just described except that the second element 54$^{14}$ has a ring 91 secured by bolts 92 to its end, the ring holding the machine element in place axially at 93 and providing abutments for circumferentially distributed helical compression springs 88 which act axially to urge the wedge element 56$^{25}$ in this case toward engagement. This device uses permanent stable anti-friction means of the invention rather than rollers on the inclined wedge surfaces.

The axial clearance between the snap ring 94 and the second element 54$^{14}$ serves to control the radial clearance between the inclined surfaces when the device is overrunning for assuring relative stability of these members. A snap ring 94 prevents total disengagement unless disassembly is intended, in which case the snap ring 94 and ring 91 can be removed.

Figures 34, 35, 36, 37:
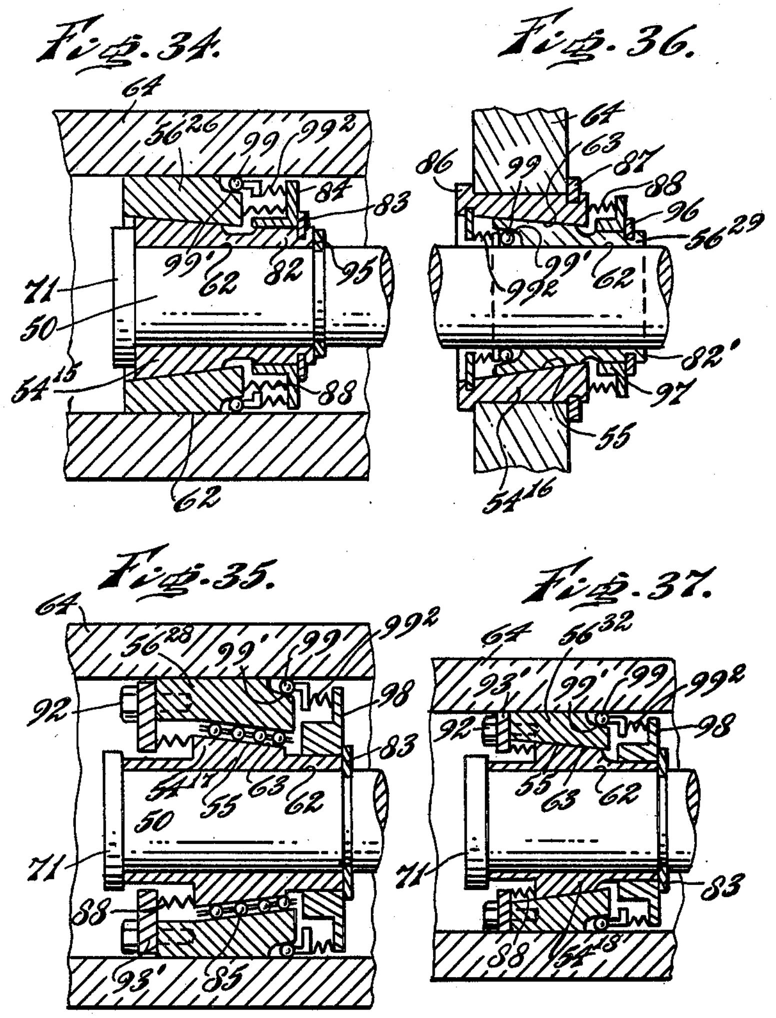
FIGURE 34 is a fragmentary axial section of an internal form of linear self-interlocking overrunning clutch.
FIGURE 35 is a view similar to FIGURE 34 showing a modification.
FIGURE 36 is a fragmentary axial section of an external form of linear self-interlocking overrunning clutch with sliding friction between the inclined surfaces of the wedge (that is, the overrunning inner member).
FIGURE 37 is a fragmentary axial section of an internal form of linear self-interlocking overrunning clutch with sliding friction between the inclined surfaces of the wedge (that is, the overrunning outer member).

FIGURE 34 shows an internal form of linear self-interlocking overrunning clutch provided with sliding permanent stable antifrictional surfaces, the flexible wedge element 56$^{26}$ in this case having its straight surface against the outer ring straight surface 62 and the second member 54$^{15}$ in this case being secured by shoulder 71 and snap ring 95 on the shaft.

The spring arrangement is similar to that in FIGURE 32 except springs 99$^{2}$ are supported by the same flange 84 which is supporting springs 88.

FIGURE 35 is a device similar to FIGURE 34, with the spring position means similar to FIGURE 33, and with balls on the inclined surfaces. In this case the second element 54$^{17}$ is held as described in FIGURE 34, but is recessed at the large end to provide room for helical compression springs 88 which act against a ring abutment 93' held by bolts 92 on the end of the flexible wedging member 56$^{28}$ which has a straight circumferential outer surface engaging the inner bore of the machine part.

It is not necessary to use rolling elements between the inclined wedge surfaces and FIGURE 36 shows a device similar to FIGURE 35 where the surfaces 63 and 55 have sliding friction as earlier described, the spring mounting being on a snap ring 96 in a suitable groove, at the end of one wedging element 56$^{29}$ which cooperates with the second element 54$^{16}$, there being a spacer washer 97 which determines freedom for overrunning by limiting the extent of movement into overrunning position as show. The spacer washer 97 is around an annular part of the extension 82' on the wedging element 56$^{29}$, and allows freedom for the wedges to move axially.

The form of FIGURE 37 is an internal form of linear self-interlocking overrunning clutch with sliding friction between the inclined wedging surfaces, the overrunning member being the outer member. The device is very similar to FIGURE 35 where relative motion between the second element 54$^{18}$ and the wedge member 56$^{32}$ is determined by a ring 98 in a suitable groove in the outside of the end of the second element.

It will be evident that the balls will release in one longitudinal direction of motion.

It will be evident that the device of the invention in operation can function both as a fastening device and as an overrunning clutch or lost motion device as desired, the wedging element acting in one direction to cause gripping and to impart a radial component to grip on the straight surface or straight surfaces, and permissibly release in the other direction of motion.

It will be evident that self-releasing will be especially important in overrunning clutches and devices of that sort, whereas in many other cases it may not be necessary.

EXAMPLE 1

This is a self-interlocking wedge device with a conical wedge of external form which corresponds to FIGURE 1. It provides self-releasing from natural disengagement.

The collar is of steel and has an interior straight surface with a finish of RMS 125 and has a hardness of 350 Brinell and preferably 430 Brinell. The wedge device is of similar hardness and of similar steel.

The inclined surfaces have a polytetrafluoroethylene (Teflon) adhering coating and the coefficient of starting friction between the inclined surfaces is 0.04 to 0.05.

The calculations are as follows:

$$\tan \alpha = 0.120$$
$$\mu = \tan \phi = 0.040$$
$$\alpha = 6°51' \text{ or } 6.85°$$
$$\phi = 2°18' \text{ or } 2.30°$$

The value of the coefficient of starting friction on the straight contact steel surfaces is in the range between 0.3 and 0.4 and has an average value of $f=0.3$.

$$f > \tan(\alpha+\phi)$$
$$0.3 > \tan(6°51'+2°18')$$
$$0.3 > \tan(9°9')$$
$$0.3 > 0.161$$

The safety factor for self interlocking action is $$d=\frac{0.3}{0.161}=1.86$$

The safety factor for self releasing action is $$d_1=\frac{6.85}{2.30}=2.98$$

EXAMPLE 2

Another device was tested having somewhat different dimensions. The steel parts were heat treated to 50 Rockwell C and this device corresponded to FIGURE 12.

$\tan\alpha=0.08$
$\mu=\tan\phi=0.040$
$\alpha=4°35'$ or $4.58°$
$\phi=2°18'$ or $2.30°$
$0.3>\tan(4°35'+2°18')$
$0.3>\tan 6°53'$
$0.3>0.1207$ The safety factor for self-interlocking action is $$d=\frac{0.3}{0.121}=2.48$$

The safety factor for self-releasing action is $$d_1=\frac{4.58}{2.30}=1.99$$

EXAMPLE 3

When using dry baked molybdenum disulfide lubricating coating on the inclined wedge surfaces, of the structure of Example 2, with the coefficient of starting friction $\mu=0.09$. This device will perform self-interlocking action only but will require additional force for disengaging as follows:

$\tan\alpha=0.08$
$\mu=\tan\phi=0.09$
$\alpha=4°35'$ or $4.58°$
$\phi=5°9'$ or $5.15°$
$0.3>\tan(4°35'+5°9')$
$0.3>\tan(9°44')$
$0.3>0.171$ The safety factor for self-interlocking action is $$d=\frac{0.3}{0.171}=1.75$$

The safety factor for self-releasing is $$d_1=\frac{4.58}{5.15}=0.89$$

Since this safety factor for self-releasing is less than unit, self-releasing is impossible with this device.

EXAMPLE 4

The thrust (retaining) capacity F in pounds of self-interlocking collar for the structure of Example 1 is as follows:

$$F=\pi\times D\times l\times Sc\times\tan(\alpha+\phi)$$

where:

D=diameter of the bar in inches
$l$=engaged length of the inclined surfaces in inches
Sc=contact (radial) stress on the straight cylindrical bar surface in p.s.i.

$$F=3.14\times0.75\times0.75\times50{,}000\times0.161=14{,}200 \text{ pounds}$$

At this maximum load the tangential stress in the external member will reach a level of only 50% of the elastic limit of the steel used.

For sliding and rolling types of linear self-interlocking clutches the tangent of the angle of inclination $\alpha$ may be preferably in the range between 0.08 and 0.12. The coefficient of starting friction on straight overrunning clutches preferably will not exceed $f=0.2$.

The rolling coefficient of friction on inclined surfaces may be of the order of $\mu=0.001$ and for sliding clutches the coefficient of starting friction preferably should not exceed $\mu=0.06$.

It will be evident in the preferred embodiment of the device of the invention, the coefficient of starting friction on the inclined wedge surface is lower than 0.25, while the coefficient of starting friction on the straight surface should be substantially greater than said coefficient of starting friction on the inclined wedge surface.

In view of my invention and disclosure, variations and modifications to meet individual whim or particular need will doubtless become evident to others skilled in the art, to obtain all or part of the benefits of my invention without copying the apparatus shown, and I, therefore, claim all such insofar as they fall within the reasonable spirit and scope of my claims.

Having thus described my invention what I claim as new and desire to secure by Letters Patent is:

1. In a linear self-interlocking wedge device, a first member of closed curved cross section, a second member of closed cross section in spaced relation to the first member, relatively longitudinally movable with respect to the first member in one direction of motion and having restraint transverse to said direction of motion, one of the first and second members surrounding the other in spaced relation, the surface of the first member directed toward the second member being free from serrations and shoulders and extending in the direction of motion and the surface of the second member directed toward the first member being tapered and inclined to the direction of motion, a radially expandable and contractable tapered wedge member interposed between said first and second members, having a surface in sliding contact with the surface of the first member extending in the direction of motion and having an inclined wedge surface in sliding contact with the inclined wedge surface of the second member, one of said sliding inclined wedge surfaces having stable permanent anti-friction material thereon, said wedge member having a lower frictional coefficient at the inclined wedge surface of the second member than the frictional coefficient at the cooperating straight surface of the first member, said wedge device complying with the following condition:

$$f>\tan(\alpha+\phi)$$

where:

$f$ is the coefficient of starting friction of the wedge device on the straight surface of said first member,
$\alpha$ is angle of inclination of the inclined wedge surface with respect to the direction of motion,
$\phi$ is the frictional angle of the inclined wedge surface, the coefficient of starting friction of the inclined wedge surface being $\tan\phi$, and mechanism for positively holding the wedge member against that surface of the first member which extends in the direction of motion during at least initial engagement for self-tightening, consisting of positive means mounted on the wedge device and exerting a force on said wedge member for urging said wedge member longitudinally with respect to said second member in a direction to pre-engage the first member and the wedge member by force of said second member against said wedge member, whereby the tapered surface of the wedge member produces a normal component which causes the longitudinally straight surface of the wedge member to interlock with said first member in the direction of motion.

2. In a linear self interlocking wedge device for mounting a somewhat larger hub on a straight shaft free from serrations annd shoulders and having an axis, an outer radially contractable and expandable wedge member of closed curved cross section for surrounding the shaft within the hub, movable in the direction of the axis, the outer wedge member having an inner curved surface which is tapered and inclined to the axis and an outer circumferentially curved and axially straight surface which extends in the direction of the axis and is adapted to fit within the hub, an inner radially contractable and expandable wedge member having on the inside an axially straight and circumferentially curved surface adapted to surround and engage the shaft and having a circumferentially curved inclined wedge surface in sliding contact with the inclined wedge surface on the outer wedge member, at least one of said sliding inclined wedge surfaces having stable permanent anti-friction material thereon, said wedge members having a lower frictional coefficient at the inclined wedge surfaces than the frictional coefficient at their straight surfaces, said wedge device complying with the following condition:

$$f > \tan(\alpha + \phi)$$

where:

$f$ is the coefficient of starting friction of the wedge device at the straight surfaces.

$\alpha$ is the angle of inclination of the inclined wedge surfaces with respect to the axis, $\phi$ is the frictional angle of the inclined wedge surfaces, the coefficient of starting friction of the inclined wedge surfaces being $\tan \phi$, and mechanism mounted on the wedge device and exerting a force on said wedge members for positively holding the inner wedge member against the shaft during at least initial engagement for self-tightening, whereby the tapered surfaces of the wedge members produce a normal component which causes the longitudinally straight surfaces of the wedge members to interlock with the shaft and the hub, in combination with locking means torsionally securing said inner and outer wedge members against rotation, allowing freedom for longitudinal motion of the wedge members with respect to one another and preventing circumferential change of position.

3. A device of claim 2, in which said locking means torsionally securing the outer wedge member against the inner wedge member comprises cooperating radial slots in said wedge members and a key in the slots preventing circumferential change of position, and said slots cutting through only a portion of the material of the wedge members and leaving part of the material on both sides of said slots intact, the intact material preventing change of width in the slots when the device undergoes expansion and contraction of the wedge members during preengagement.

4. A device of claim 1, in which said means for positively holding the wedge member against the longitudinally straight surface of the first member comprises multiple circumferentially spaced screw members acting on said wedge device.

References Cited

UNITED STATES PATENTS

| | | | |
|---|---|---|---|
| 2,465,471 | 3/1949 | Packer | 287—52.06 |
| 2,554,348 | 5/1951 | Rudolph | 287—52.06 |
| 448,573 | 3/1891 | Laney | 287—52.06 |
| 929,762 | 8/1909 | Hess | 287—52.06 XR |
| 968,113 | 8/1910 | Bernard | 287—116 XR |
| 2,755,093 | 7/1956 | Peter et al. | 287—53 XR |
| 2,818,288 | 12/1957 | Karlson | 287—52.04 XR |
| 2,867,460 | 1/1959 | Johnson | 287—53 XR |
| 3,175,455 | 3/1965 | Reddy | 287—52.06 XR |

REINALDO P. MACHADO, Primary Examiner

ANDREW V. KUNDRAT, Assistant Examiner

U.S. Cl. X.R.

287—116